US006912073B2

(12) United States Patent
Wildeman et al.

(10) Patent No.: US 6,912,073 B2
(45) Date of Patent: Jun. 28, 2005

(54) OPTICAL FILTER ARRAY AND METHOD OF USE

(75) Inventors: George F. Wildeman, Painted Post, NY (US); Michael Yadlowsky, Corning, NY (US)

(73) Assignee: Corning Incorporated, Corning, NY (US)

( * ) Notice: Subject to any disclaimer, the term of this patent is extended or adjusted under 35 U.S.C. 154(b) by 133 days.

(21) Appl. No.: 10/186,068

(22) Filed: Jun. 28, 2002

(65) Prior Publication Data

US 2003/0175007 A1 Sep. 18, 2003

Related U.S. Application Data

(63) Continuation-in-part of application No. 10/099,111, filed on Mar. 15, 2002.

(51) Int. Cl.[7] .............................. G02B 1/10; G02B 5/32
(52) U.S. Cl. ............................ 359/3; 359/15; 359/578; 359/587; 359/900
(58) Field of Search ........................... 359/3, 578, 587, 359/15, 900; 398/48, 85; 385/24

(56) References Cited

U.S. PATENT DOCUMENTS

| 4,266,012 | A | * | 5/1981 | Stookey | 430/396 |
|---|---|---|---|---|---|
| 4,373,782 | A | | 2/1983 | Thelen | 359/588 |
| 4,514,053 | A | | 4/1985 | Borrelli et al. | 359/569 |
| 4,671,603 | A | | 6/1987 | McQuoid et al. | 359/15 |
| 5,285,517 | A | * | 2/1994 | Wu | 385/142 |
| 5,287,427 | A | | 2/1994 | Atkins et al. | 385/124 |
| 5,757,540 | A | | 5/1998 | Judkins et al. | 359/341 |
| 6,023,545 | A | | 2/2000 | Eldada et al. | 385/37 |
| 6,212,312 | B1 | | 4/2001 | Grann et al. | 385/24 |
| 6,306,563 | B1 | | 10/2001 | Xu et al. | 430/321 |

(Continued)

FOREIGN PATENT DOCUMENTS

| EP | 0887964 | 12/1998 |
|---|---|---|
| JP | 09033750 | 2/1997 |
| WO | WO0157570 | 8/2001 |
| WO | WO 02/10083 A1 * | 2/2002 |

OTHER PUBLICATIONS

U.S. Appl. No. 60/221,811.*
M. Douay, et al. "Densification Involved in the UV–Based Photosensitivity of Silica Glasses and Optical Fibers", J. Lightwave Technology, vol. 15, No. 8, pp. 1329–1342, Aug. 1997.*
H. Poignant, et al., "Influence of H2 Loading on the Kinetics of Type IIA Fibre Bragg Grating Photoinscription", IEE Colloq. on Optical Fibre Gratings, Feb. 7, 1997, Dig. No. 1997/037, pp. 2/1–2/7.*

(Continued)

Primary Examiner—John Juba, Jr.
(74) Attorney, Agent, or Firm—James V. Suggs; Timothy M. Schaeberle

(57) ABSTRACT

In accordance with an exemplary embodiment of the present invention, an optical apparatus includes a glass monolithic structure including a plurality of optical filter elements, and the glass monolithic structure is not an optical fiber. In accordance with another exemplary embodiment of the present invention, an optical apparatus includes a glass monolithic structure which includes a plurality of optical filter elements. The optical apparatus further includes a device which selectively aligns an optical input and an optical output to one of said plurality of optical filter elements. In accordance with another exemplary embodiment of the present invention, a method of adding/dropping a particular frequency from an optical signal includes providing a glass monolithic structure which further includes a plurality of optical filter elements. The method further includes providing a device which selectively aligns an optical input and an optical output to one of the plurality of optical filters.

47 Claims, 13 Drawing Sheets

U.S. PATENT DOCUMENTS

| | | |
|---|---|---|
| 6,389,199 B1 | 5/2002 | Eldada et al. .................. 385/37 |
| 6,510,264 B2 | 1/2003 | Bhagavatula et al. ......... 385/37 |
| 6,555,288 B1 | 4/2003 | Xu et al. .................. 430/270.1 |
| 6,807,339 B1 * | 10/2004 | Tsai et al. ..................... 385/37 |
| 6,819,871 B1 * | 11/2004 | Baldwin et al. .............. 398/85 |
| 2002/0033031 A1 | 3/2002 | Borrelli et al. ............... 65/404 |
| 2002/0045104 A1 | 4/2002 | Efimov et al. .................. 430/2 |
| 2002/0122647 A1 | 9/2002 | Blomquist et al. .......... 385/129 |
| 2002/0123419 A1 | 9/2002 | Borrelli et al. ............... 501/66 |
| 2002/0176126 A1 * | 11/2002 | Psaltis et al. ................. 359/15 |
| 2003/0029203 A1 | 2/2003 | Borrelli et al. ............... 65/404 |
| 2003/0055120 A1 | 3/2003 | Blomquist ..................... 522/1 |
| 2003/0174403 A1 | 9/2003 | Yadlowsky et al. ......... 359/578 |
| 2003/0174423 A1 | 9/2003 | Hart et al. .................. 359/889 |
| 2003/0174424 A1 | 9/2003 | Hart et al. .................. 359/889 |
| 2003/0175006 A1 | 9/2003 | Wildeman et al. .......... 385/147 |
| 2003/0176629 A1 | 9/2003 | Blomquist et al. .......... 528/401 |
| 2003/0179788 A1 | 9/2003 | Wildeman et al. ............ 372/20 |

OTHER PUBLICATIONS

D.J. McCartney, et al., "Position–tunable holographic filters in dichromated gelatin for use in single–mode–fiber demultiplexers", Optics Letters, vol. 10, No. 6, pp. 303–305. Jun. 1995.*

U.S. Appl. No. 60/221,770.*

S.S. Duncan, J.A. McQuoid and D.J. McCartney; "Holographic Filters in Dichromated Gelatin Position Tuned Over the Near–Infrared Region"; Optical Engineering 24(5), 781–785 (Sep./Oct. 1985).

* cited by examiner

OPTICAL FILTER ARRAY AND METHOD OF USE

CROSS-REFERENCE TO RELATED APPLICATIONS

The present application is a continuation-in-part of U.S. patent application Ser. No. 10/099,111, filed Mar. 15, 2002, entitled "Optical Filter Array and Method of Use." The present application is related to U.S. patent application Ser. No. 10/186,121 AND Ser. No. 10/184,865 entitled "Optical Filter Array" and "Tunable Optical Filter Array and Method of Use," respectively, both of which are filed on even date herewith. The inventions described in these applications are assigned to the assignee of the present invention, and the disclosures of these applications are incorporated by references herein and for all purposes.

FIELD OF THE INVENTION

The present invention relates generally to optical communications, and particularly to a fixed optical filter array and its method of use.

BACKGROUND OF THE INVENTION

Optical transmission systems, including optical fiber communication systems, have become an attractive alternative for carrying voice and data at high speeds. While the performance of optical communication systems continues to improve, there is increasing pressure on each segment of the optical communication industry to reduce costs associated with building and maintaining an optical network.

One useful technology for improving performance and reducing the overall cost of the optical communication system is through the use of wavelength division multiplexing (WDM). As is well known, WDM pertains to the transmission of multiple signals (in this case optical signals) at different wavelengths down a single waveguide (e.g., optical fiber) with a channel being assigned to each wavelength, and each channel having a particular bandwidth. The nominal wavelength of a given channel is often referred to as the channel center wavelength.

For purposes of illustration, according to one International Telecommunications Union (ITU) grid a wavelength band from 1530 nm to 1565 nm is divided up into a plurality of wavelength channels, each of which have a prescribed center wavelength and a prescribed channel bandwidth; and the spacing between the channels is prescribed by the ITU grid.

For example, one ITU channel grid has a channel spacing requirement of 100 GHz (in this case the channel spacing is referred to as frequency spacing), which corresponds to channel center wavelength spacing of 0.8 nm. With 100 GHz channels spacing, channel "n" would have a center frequency 100 GHz less than channel "n+1" (or channel n would have a center wavelength 0.8 nm greater than channel n+1).

In WDM systems all of the channels are combined (multiplexed) at one end of the system, and separated (demultiplexed) at the other end for further use. The separation of individual wavelength channels may be carried out using optical filters. Currently, most multiplexing/demultiplexing schemes are based on fixed filters. However, there is a need in optical networks to provide flexibility that is not afforded by conventional fixed filter designs.

In addition to WDM systems, optical filters are useful in certain laser and amplifier applications. The lasers used in optical communication systems may be tunable. Moreover, erbium-doped fiber amplifiers (EDFA's) have been deployed widely in optical communication and sensor applications. Optical filters may be used to suppress broadband amplified spontaneous emission (ASE) around the signal from EDFA's and tunable lasers.

Accordingly, optical filter arrays serve a useful purpose in a variety of applications. What is needed is an optical filter array that overcomes the shortcomings of conventional optical filter arrays.

SUMMARY OF THE INVENTION

In accordance with an exemplary embodiment of the present invention, an optical filter array includes a plurality of optical filter elements which are disposed in a glass monolithic structure, and the glass monolithic structure is not an optical fiber.

In accordance with another exemplary embodiment of the present invention, an optical apparatus includes a glass monolithic structure which includes a plurality of optical filter elements. The optical apparatus further includes a device which selectively aligns an optical input and an optical output to one of said plurality of optical filters.

In accordance with another exemplary embodiment of the present invention, a method of adding/dropping a particular frequency from an optical signal includes providing a glass monolithic structure which further includes a plurality of optical filter filters.

In accordance with another exemplary embodiment of the present invention, a method of adding/dropping a particular frequency from an optical signal includes providing a glass monolithic structure which further includes a plurality of optical filter elements. The method further includes providing a device which selectively aligns an optical input and an optical output to at least one of the plurality of optical filters.

In accordance with another exemplary embodiment of the present invention, an optical apparatus, includes a bulk glass monolithic structure which includes a plurality of optical fiber elements.

In accordance with another exemplary embodiment of the present invention, an optical apparatus includes at least one monolithic structure formed in a photosensitive organic medium, the monolithic structure including a plurality of optical filters; and at least one device which selectively aligns an optical input and an optical output to one of said plurality of optical filters.

BRIEF DESCRIPTION OF THE DRAWINGS

The invention is best understood from the following detailed description when read with the accompanying drawing figures. It is emphasized that the various features are not necessarily drawn to scale. In fact, the dimensions may be arbitrarily increased or decreased for clarity of discussion.

DETAILED DESCRIPTION

Figure 1:
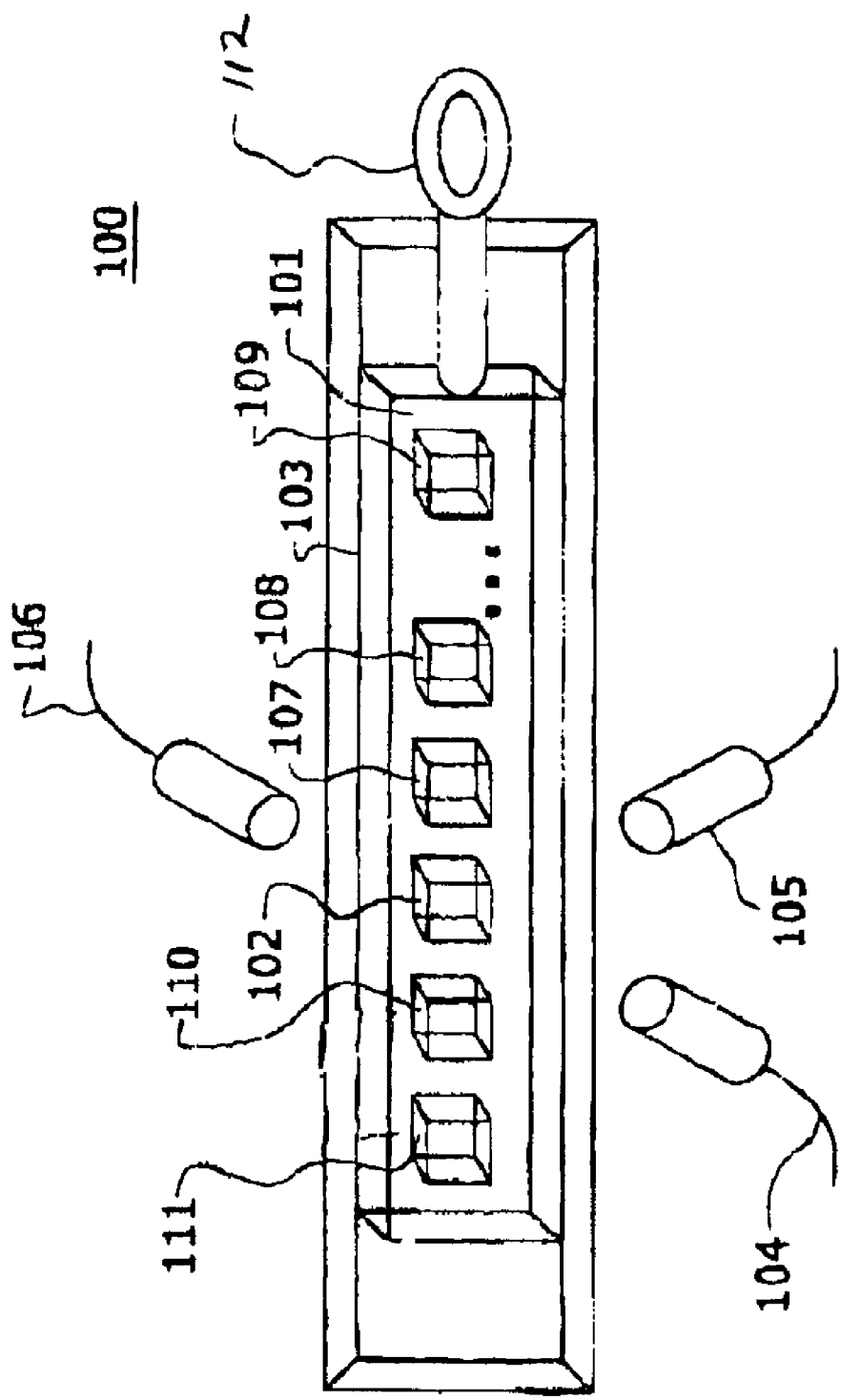
FIG. 1(a) is a perspective view of an exemplary embodiment of the present invention.
FIG. 1(b) is a graph of refractive index change versus anneal time for gratings fabricated in accordance with the present invention.
FIG. 1(c) is a perspective view of an exemplary embodiment of the present invention in which a translation stage is cooperatively engaged.
FIGS. 1(d)–1(h) are perspective views of various input/output devices coupled to a monolithic filter array in accordance with exemplary embodiments of the present invention.

In the following detailed description, for purposes of explanation and not limitation, exemplary embodiments disclosing specific details are set forth in order to provide a thorough understanding of the present invention. However, it will be apparent to one having ordinary skill in the art having had the benefit of the present disclosure, that the present invention may be practiced in other embodiments that depart from the specific details disclosed herein. Moreover, descriptions of well-known devices, methods and materials may be omitted so as to not obscure the description of the present invention.

Briefly, the present invention is drawn to a glass monolithic optical filter array, apparati incorporating the glass monolithic filter array, and methods of use of the apparati. In accordance with an exemplary embodiment of the present invention, the glass monolithic optical filter array includes a plurality of optical filter elements. In this illustrative embodiment, each of the optical filters will extract a particular wavelength channel having a particular center wavelength from a plurality of wavelength channels. Advantageously, the glass monolithic optical filter array is fabricated on a common substrate, and by a method which facilitates large-scale production with improved yield and reduced cost when compared to conventional techniques. Finally, the glass monolithic optical filter array and its method of manufacture foster a great deal of versatility, enabling the manufacturer to tailor optical filter arrays for a specific use, without requiring significant variation in processing.

As will become clearer as the present invention proceeds, the optical filters in accordance with exemplary embodiments of the present invention may be reflective- type filters, transmissive-type filters or a combination of different reflection-type filters and/or transmissive-type filters.

It is noted that for purposes of facility of discussion, the disclosure of the present invention will focus on reflective-type filter, although it is to be understood that transmissive-type filters may be used as well. One salient feature of the optical filters in accordance with exemplary embodiments of the present invention is the capability of monolithic fabrication using various glass materials.

It is further noted (again for clarity of discussion) that the present disclosure focuses primarily on the use of optical filters of the present invention in multiplexing/demultiplexing applications in optical communication systems. However, the optical filters of the present invention have utility in a variety of other applications.

According to one exemplary embodiment, the inventive optical filter arrays also could be used in EDFA applications where the amplifier operates over a relatively wide bandwidth. Additionally, the inventive optical filter arrays may be deployed to reduce broadband ASE around a signal channel. To this end, the optical filter elements of the optical filter arrays in accordance with an exemplary embodiment of the present invention exhibit an insertion loss versus frequency/wavelength that has both steep transition regions outside of the passband of the filter element and a relatively flat filter function (e.g., in a 50 GHz system, the insertion loss variation of an exemplary filter element is illustratively less than approximately 2 dB over the full width of 30 GHz, while having an extinction of greater than about 20 dB over an 80 GHz full width). As a result, there is 'room' within the passband of the filter element for the laser signal to vary (e.g., approximately 10 GHz variation) without experiencing substantial attenuation.

In accordance with another exemplary embodiment of the present invention, the optical filter elements are Bragg gratings which are chirped (linearly or non-linearly) for use as a chromatic dispersion compensator.

It is further noted that the above examples of the utility of the monolithic optical filter arrays of the present invention are merely illustrative of, and are intended to be in no way limiting. Clearly, other implementations of the glass monolithic optical filter array will be readily apparent to one of ordinary skill in the art who has had the benefit of applicants' disclosure.

FIG. 1(a) shows an optical apparatus 100 in accordance with an exemplary embodiment of the present invention. The optical apparatus 100 includes a 1×N optical filter array 101 which is illustratively a glass monolithic optical filter array including a plurality of optical filter elements 102 fabricated in the glass substrate 103. In the presently described exemplary embodiment the optical filter array 101 includes N-filters for n-wavelength channels having center wavelengths $\lambda_1, \ldots, \lambda_n$. For purposes of illustration, n and N may be 40, 80, 100, 200 or 400. Of course, this is merely illustrative and intended to be in no way limiting of the present invention.

Illustratively, the optical filter elements 102 are reflective filter elements. For example, the optical filter elements 102 may be Bragg gratings such as those described in detail in U.S. patent application Ser. No. 09/874,721, entitled "Bulk Internal Bragg Gratings and Optical Devices," to Bhagavatula, et al., and filed on Jun. 5, 2001. Moreover, the substrate 103, which is illustratively a bulk glass may be a glass material such as those taught in U.S. patent application Ser. No. 09/874,342, entitled "UV Photosensitive Melted Germano-Silicate Glass," to Borrelli, et al., and filed on Jun. 5, 2001; or may be one of the glass material as taught in U.S. patent application Ser. No. (Corning Incorporated Patent Department Docket No.: SP01-222B) and entitled "Photosensitive UV Glasses" to Nicholas Borrelli, et al., filed on even date herewith. The inventions described in the above referenced U.S. patent applications are assigned to the Assignee of the present invention, and the disclosures of these applications are specifically incorporated by reference herein and for all purposes.

In one exemplary embodiment of the present invention, the substrate is formed from a meltable glass having a molecular hydrogen content of $\geq 10^{17}$ $H_2$ molecules/cm$^3$. This meltable glass may be, for example, a germanosilicate glass. In another exemplary embodiment of the invention, the substrate is formed from a meltable photosensitive germanosilicate glass material having a hydrogen content less than approximately $10^{17}$ $H_2$ molecules/cm$^3$. In one embodiment of the invention, the substrate is formed from a glass material having a composition including approximately 40 mole % to approximately 80 mole % $SiO_2$, approximately 2 mole % to approximately 15 mole % $GeO_2$, approximately 10 mole % to approximately 36 mole % $B_2O_3$, approximately 1 mole % to approximately 6 mole % $Al_2O_3$, and approximately 2 mole % to approximately 10 mole % $R_2O$ wherein R is an alkali. In another embodiment of the invention, the substrate is formed from a glass material having a composition including approximately 25 weight % to approximately 45 weight % $SiO_2$, approximately 3 weight % to approximately 22 weight % $GeO_2$, approximately 7 weight % to approximately 28 weight % $B_2O_3$, approximately 6 weight % to approximately 22 weight % $Al_2O_3$, approximately 6 weight % to approximately 25 weight % $R_2O$ wherein R is an alkali, and approximately 3–11 weight % F.

The monolithic structure of the present invention may be formed from a variety of materials. As described above, the monolithic structure may be formed in a substrate of the glass materials taught in the above-referenced Borrelli et al. applications. Alternatively, other photosensitive glass materials may be used as the substrate material. For example, suitable materials include glasses that achieve an index change by thermally induced growth of crystals on light-induced nucleation centers, such as those described in U.S. Pat. No. 4,514,053, and the photo-thermo-refractive glasses described in U.S. patent application Publication No. U.S. Pat. No. 2002/0,045,104. Other desirable photosensitive glasses include doped porous glasses which are consolidated at a relatively high temperature. While the preferred embodiments given below are described with reference to a glass monolithic structure, the skilled artisan will recognize that the monolithic structure may be formed from other photosensitive materials.

It is further noted that the above referenced gratings and materials are intended to be illustrative of and in no way limiting of the scope of the present invention. In an exemplary embodiment of the present invention, photosensitive organic materials are used as the substrate in which optical filter elements may be formed. For example, materials such as dichromated gelatin and photosensitive polymeric materials may be used to form the monolithic structures of the present invention. Fluorinated polymeric materials are especially suitable for use in the present invention. Polymer-dispersed liquid crystal materials may also be suitable for use as the substrate in the present invention. According to one embodiment of the present invention, the monolithic structures of the present invention may be formed in polymeric materials having a shortest dimension of greater than about 100 μm, illustratively greater than about 400 μm.

Especially suitable polymers for use in the present invention are described, for example, in U.S. patent application Ser. Nos. 09/745,076, 09/747,068, 09/912,827, and 10/067,669, which are incorporated herein by reference. Especially desirable polymeric materials for use in the present invention are cured products of energy curable compositions including two monomers having differing refractive index and rates of diffusion. One exemplary fluoropolymer material is the cured product of an energy curable composition including about 50 wt % 2,2,3,3,4,4,5,5-octafluorohexanediol diacrylate (UV-8), and about 50 wt % of the tetraacrylate of FLUOROLINK T, a tetrafunctional perfluoropolyether alcohol available from Ausimont USA. The tetraacrylate, known herein as UV-T, has the structure

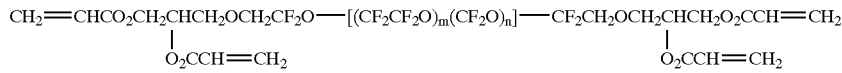

The energy curable composition also includes about 1 wt % photoinitiator.

In an exemplary embodiment of the invention, the monolithic filter elements of the present invention is fabricated by casting the energy curable composition described above into a mold having the desired dimensions. For example, the mold may have a parallelepiped shape with no interior dimension shorter than 100 μm. A grating is formed in the monolithic element using the method described in U.S. Pat. No. 6,023,545, which is incorporated herein by reference. The energy curable composition is partially cured by brief (e.g. a few seconds) exposure to a suitable UV light source. The partially cured polymer is irradiated through a phase mask with UV radiation from an argon ion laser, forming the grating. The element is then exposed again to a suitable UV light source to fully cure the polymer, and the cured monolithic element is removed from the mold.

Figure 1B:
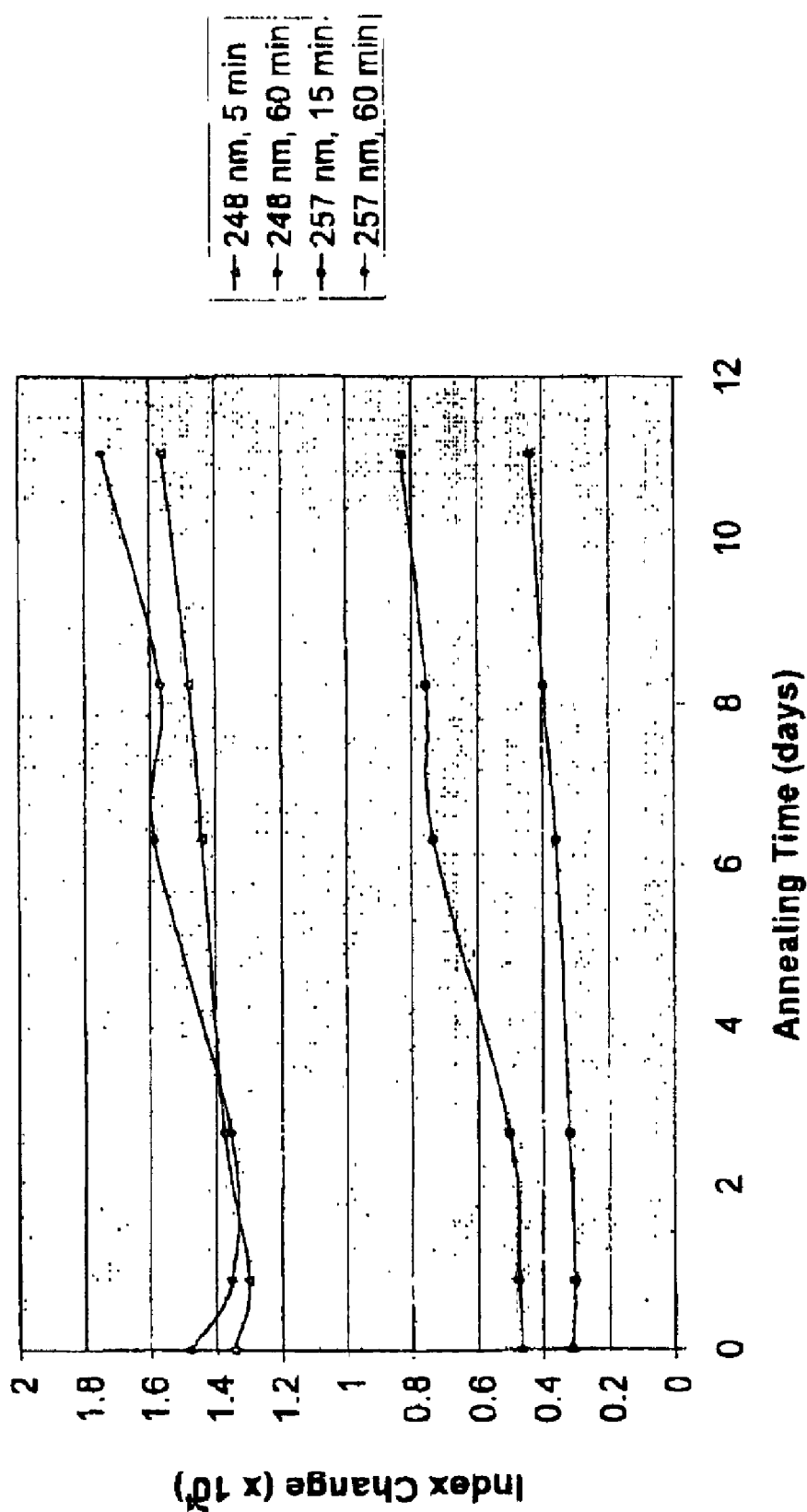

Certain advantageous characteristics of the optical filter elements 102 are noted presently. One advantageous characteristic of the glass monolithic optical filter elements 102 in accordance with the presently described exemplary embodiments, is long-term reliability. It is desired that the gratings which comprise optical filter elements 102 remain substantially unchanged over time. To wit, as shown in FIG. 1(b), the refractive index change versus anneal time for gratings fabricated in a glass material referenced above is shown.

In addition to being reliable over time, the gratings which comprise the optical filter elements 102 are relatively large in volume (cross-sectional area times the length of the grating), for example relative to that of conventional fiber Bragg grating. This relatively large volume simplifies the optical coupling to an optical waveguide (e.g., an optical fiber) over the air gap necessary for spatial tuning. To fabricate such gratings, a relatively highly photosensitive medium is needed that is also relatively transmissive (low-loss) in the ultra-violet (UV) spectrum. These advantageous characteristics of the medium are provided, for example, by the melted glass materials of the inventions to Borrelli et al., referenced above, and by the fluoropolymeric materials referenced above.

The UV transmittivity enables the gratings to be written relatively deeply in the bulk glass material of the substrate 103. For purposes of illustration, a loss of approximately 5 dB/mm to approximately 2 dB/mm (or less) at the wavelengths at which the gratings are written is useful. The gratings are written in such low-loss glass materials at a wavelength in the range of approximately 220 nm to approximately 280 nm, illustratively at 248 nm and 257 nm; although it is noted that the wavelengths as great as 300 nm may be used to write the gratings. For purposes of illustration and not limitation, the substrate 103 has an index of refraction of 1.49; the gratings that comprise optical filter elements 102 have a length of 7 mm, and induced refractive index change ($\Delta n$) of $2.8\times10^{-4}$. The angle of incidence is 1.5 degrees and the beam size is 100–500 μm.

It is noted that the use of Bragg gratings as optical filter elements 102 is illustrative. Other filter elements including guided mode resonance (GMR) filters as well as holographic filters generally could be used in carrying out the invention. Finally, it is conceivable that the filter elements 102 are not based on the same filter technology.

Finally, it is noted that the optical filter elements 102 may be fabricated using a variety of techniques. For example, the optical filter elements 102 may be fabricated using a plurality of phase masks, whereby one optical filter element (grating) may be written at a time. Alternatively, another type of interferometric device could be used to write the optical filter elements. Moreover, other techniques as well as variants of the techniques referenced above could be used.

In the exemplary embodiment shown in FIG. 1(a), each of the optical filters 102 is designed to reflect an optical signal of a particular frequency/wavelength channel. Illustratively, an optical signal from an input collimator 104 is incident upon a first optical filter element 102. The optical signal is illustratively a WDM or dense WDM (DWDM) optical signal having a plurality of channels, each of which has a particular center wavelength/frequency.

The first filter 102 reflects wavelength channel 1 having center wavelength $\lambda_1$. To wit, the first filter element 102 reflects a wavelength band approximately corresponding to that of channel 1, which has a center wavelength $\lambda_1$, and prescribed channel bandwidth. (Likewise, the wavelength channel n is reflected by the $n^{th}$ filter element, which reflects a wavelength band approximately corresponding to channel n, having a center wavelength $\lambda_n$ and a prescribed channel bandwidth, and transmits all other wavelengths therethrough).

The reflected light from first filter element 102 is incident upon the first output collimator 105. All other wavelength channels are transmitted through the optical filter and are incident upon the second output collimator 106, which is optional in the presently described embodiment. In this manner, in the illustrative embodiment in which the optical signal is a WDM or DWDM optical signal, one wavelength channel may be separated (demultiplexed) from the other wavelength channels in the optical signal.

The other filter elements 108, 109, 110 and 111 reflect other wavelength channels of the WDM/DWDM input optical signal. The extraction of each particular optical channel from the optical signal merely requires the alignment of the input collimator 104, and first output collimator 105 to the particular one of the other optical filter elements 108–111, which reflects light having the wavelength corresponding to center wavelength of the particular wavelength channel desired.

Alignment of the input collimator 104 and first output collimator 105 to a particular one of the optical filter elements 102 requires the relative motion of the input collimator 104 and first output collimator 105, and optical filter array 101. Illustratively, this may be carried out in a controlled manner through the use of a microcontroller which accesses a look-up table (neither of which are shown), and then commands a filter element selector 107 to effect the required relative motion of the optical filter array 101 to the input collimator 104 and first output collimator 105. (Please refer to FIG. 1(c) in which an illustrative embodiment of a translation mechanism is described in further detail.)

Finally, it is noted that in the exemplary embodiment shown in FIG. 1(a), the second output collimator 106 may be optically coupled to an input collimator of a second apparatus similar to that shown in FIG. 1(a). This cascaded structure would enable the extraction of further wavelength channels from the optical signal incident upon the second output collimator 106. Moreover, it is noted that the second output collimator may be completely forgone; and, alternatively, that the first output collimator 105 can be forgone. In the former case, the extraction of a single channel would be realized, while in the transmitted channels would be dropped. In the latter case, the reflected channel would be dropped. As will become more clear as the present description proceeds, it is possible to fabricate a channel add/drop device with the elements shown in the exemplary apparatus of FIG. 1(a).

Figure 1C:
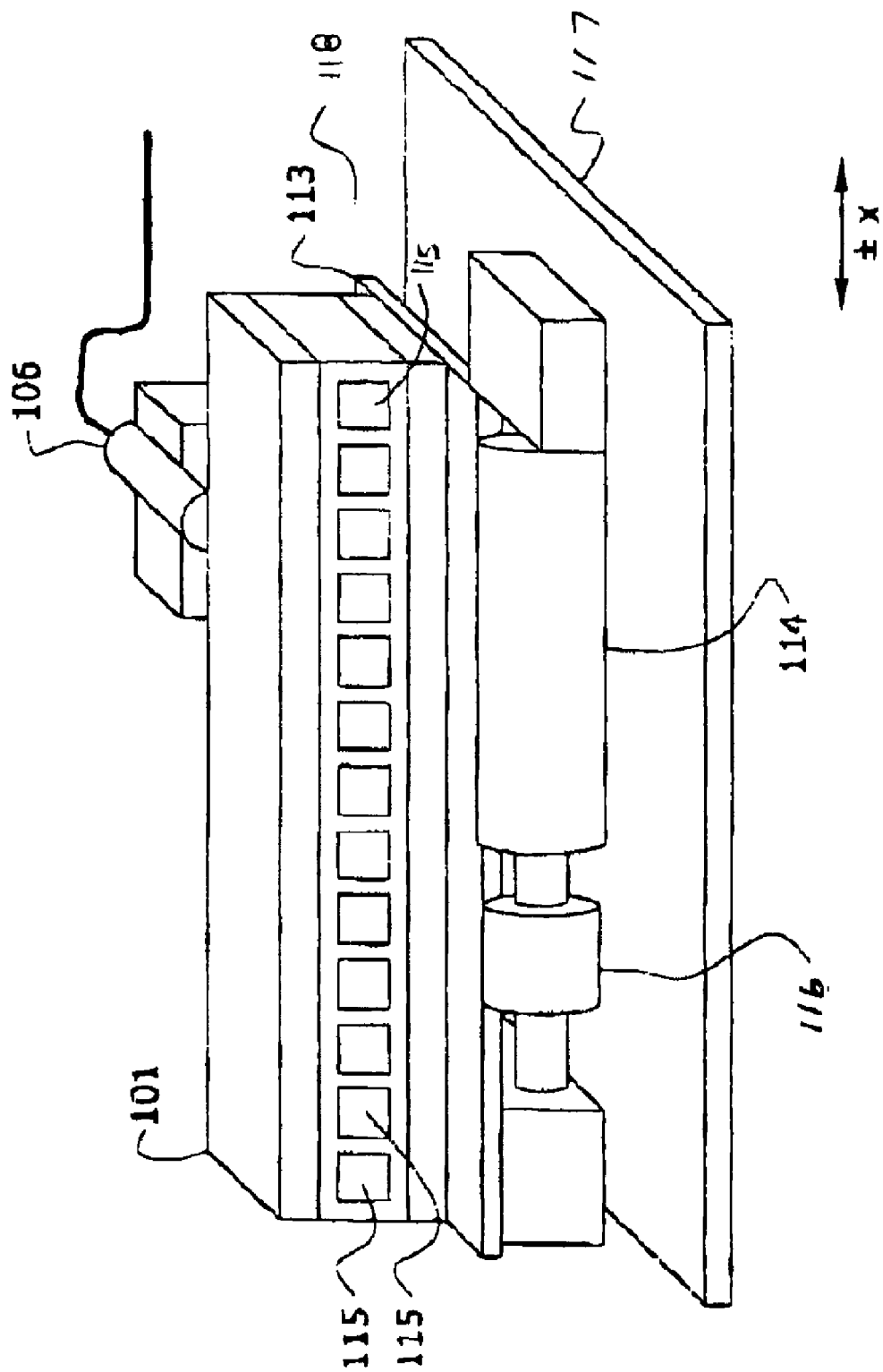
Figure 1:
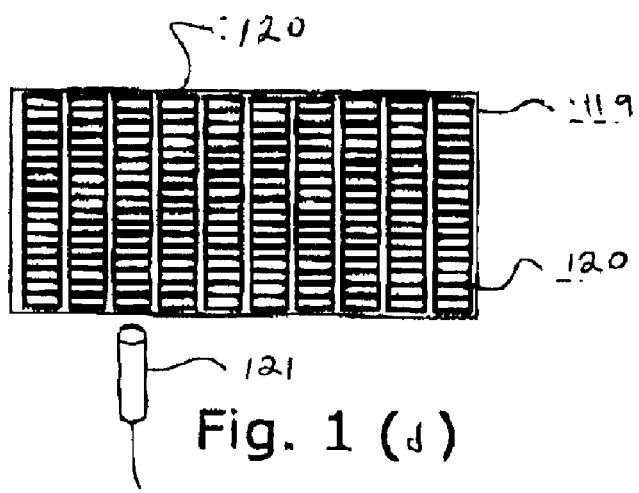
Figure 1:
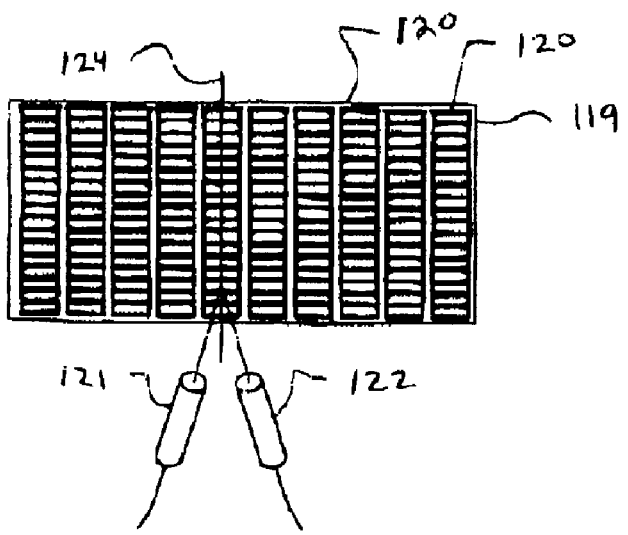
Figure 1:
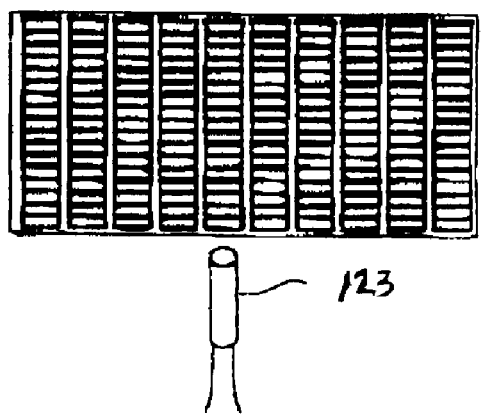
Figure 1:
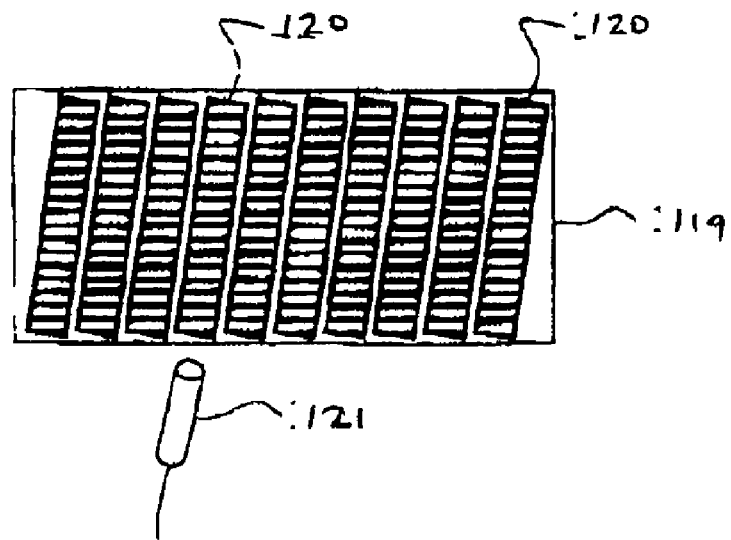
Figure 1:
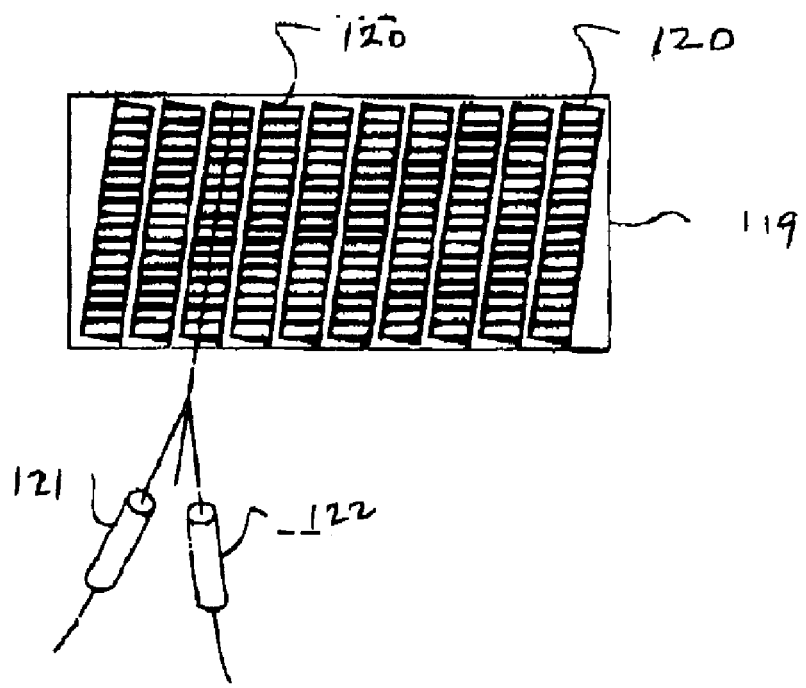

FIG. 1(c) shows the optical apparatus 100 cooperatively engaging a translation stage 112 in accordance with an exemplary embodiment of the present invention. The translation stage enables one-dimensional motion (in this case in the ±x direction) enabling the selective alignment of input and output collimators (not shown in FIG. 1(c)). The optical filter array 101, as well as optical filter elements 115, are identical in substance and function as those described in conjunction with the embodiment of FIG. 1(a). The translation stage includes a substrate 113 over which the optical filter array 101 is disposed. The translation stage 112 illustratively includes a stepper motor 114 which is monitored by an encoder 116. The stepper motor 114 and the encoder 116 are disposed on a submount 117. Alternatively, the translational motion may be effected by using a mechanical device such as a D.C. motor or linear solenoid that moves the optical filter array 101 relative to the collimators. This mechanism may in fact be manually actuated (i.e. without a motor).

It is noted that the individual optical filter elements are approximately 0.1 mm to approximately 1.0 mm in cross-section for typical WDM applications. The alignment tolerances for the optical apparatus should be roughly at least 10 times finer than this. This degree of tolerance is well within the capabilities of stepper motors, DC motors and linear solenoids discussed.

The control of the motion of the input/output collimator and output collimator is illustratively carried out as follows. A microcontroller (not shown) may access a look-up table which contains the wavelength band of each of the individual optical filter elements 115. The translation stage 112 illustratively moves either the input/output collimator (not shown) and output collimator 106, or the monolithic optical filter array 101 in the ±x direction so that selected one of filter elements 102–107 is properly aligned with the input/output collimator 109.

FIGS. 1(d)–1(h) are perspective views of various input/output devices coupled to a monolithic optical filter array in accordance with exemplary embodiments of the present invention. It is noted that the various input/output schemes may be used in carrying out the present invention as described through the exemplary embodiments of the present disclosure.

FIG. 1(d) shows a monolithic optical filter array 117 which includes a plurality of optical filter elements 118. A collimator 119 launches light at normal incidence to the optical filter. A circulator (not shown) well known to one having ordinary skill in the art is used to separate the incident light from the reflected light.

Specular reflections from the front surface may result in unwanted cross talk due to their relatively broadband nature. To suppress specular reflections, an antireflection coating, again well known to one having ordinary skill in the art, may be provided on the surface of incidence of the monolithic filter array 117. Alternatively, the surface of incidence of the monolithic filter array 117 may be beveled. Again, this is a well-known technique to one having ordinary skill in the art.

FIG. 1(e) shows an alternative technique to reduce specular reflections. In the exemplary embodiment shown in FIG. 1(e), the optical filter elements 118 may be fabricated at an angle relative to the surface of incidence of the monolithic filter array 117. Normally, whether providing a beveled surface to the monolithic filter array 117, or orienting the optical filter elements 118 at an angle, the beveled angle is on the order of approximately 4° to approximately 8°.

The above modifications improve the performance of the device, but may adversely impact the cost of the device. To reduce the cost of the device, it may be beneficial to avoid the need for a circulator. This is done by launching light at a small angle of incidence with respect to the axis of the optical filter element. To this end, as is shown in FIGS. 1(f) and 1(g), a pair of collimators (e.g., 119, 120) or a multi-port fiber collimator (e.g., 122) may be used. The relatively small, but non-normal angle of incidence relative to the axis 121 of a particular filter element 118 needed will depend on several factors, including beam sizes used (e.g., beam waists of approximately 0.2 mm to approximately 0.5 mm) and the length of the grating needed to reach the target filter shape and dispersion. The angle of incidence may be calculated using known optical design techniques. It is noted that the two separate collimator design shown in FIG. 1(d) enables the separation of the reflected signal from the incident signal without the need for a separate circulator. It is further noted that a dual fiber collimator has nearly the same functionality as a pair of single fiber collimator but is more compact and generally more cost effective. Such a device could be used as an input/selected channel output collimator pair.

Figure 8:
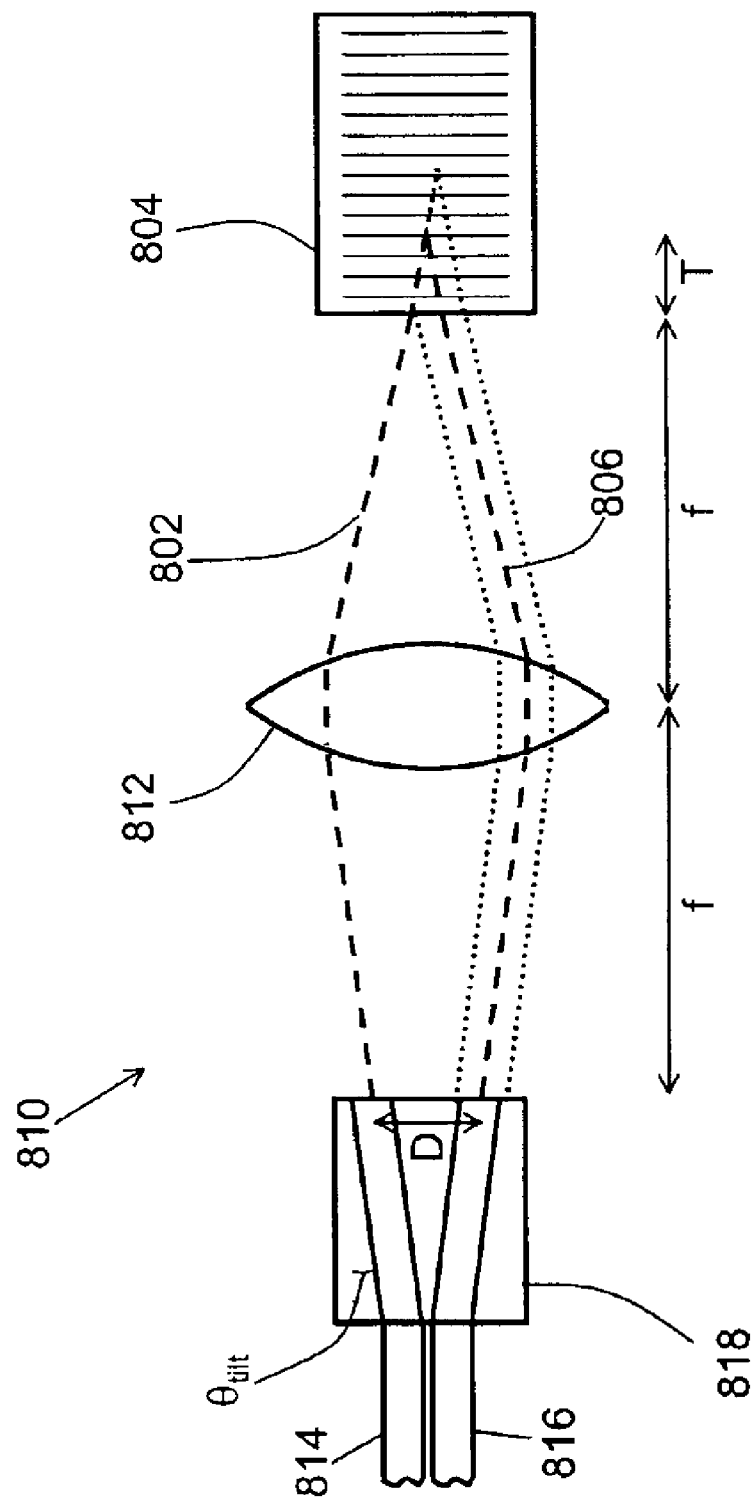
FIG. 8 is a schematic view of a dual-fiber collimator suitable for use in the present invention.

In contrast with thin-film interference filters, the reflectance of the Bragg grating filters of the present invention is distributed through the thickness of the filter. For example, as shown in FIG. 8, input beam 802 is incident upon Bragg grating filter 804 at a nonzero angle q. Input beam is reflected over a substantial thickness of Bragg grating filter 804. The distributed reflectance serves to laterally shift the center of the reflected beam 806 from the point of incidence of the input beam 802, as well as anamorphically expand the size of the beam along the axis of the shift. In order to account for these effects, the dual fiber collimator shown in FIG. 8 may be used in conjunction with the Bragg grating filters of the present invention. The collimator 810 of FIG. 8 includes a collimating lens 812, an input fiber 814, and an output fiber 816. The fibers are held in a ferrule 818. The ends of the fibers are tilted at an angle $\theta_{tilt}$ to the axis of the collimating lens, and are symmetrically disposed around the axis of the collimating lens. The collimating lens 812 approximately a focal length away from the end of the input fiber and approximately a focal length from the surface of the filter 804. The tilt angle of the optical fibers may be approximated using the equation $$\theta_{tilt} \approx \frac{T \tan\left(n \cdot \arctan\left(\frac{D}{2f}\right)\right)}{f}$$

where n is the average refractive index of the substrate material of the Bragg grating filter, T is the thickness of the Bragg grating filter at which half of the intensity of the input beam has been reflected, f is the focal length of the collimating lens, and D is the separation of the input and output optical fibers in the collimator. The skilled artisan may further optimize the tilt angle by using beam propagation techniques to maximize the overlap integral of the mode field of the output optical fiber and the field intensity of the focused beam at the end of the output optical fiber. In order to maximize the coupling of the reflected beam into the output optical fiber, it may be desirable to move the end of the output optical fiber somewhat away from the back surface of the collimating lens.

For some applications, better performance of the collimator may be achieved by using a waveguiding structure in place of the ferrule-held fibers described above. For example, the ends of the input and output fibers may be coupled to a planar waveguide configured with their ends having a proper tilt angle and separation. Waveguides with two dimensional guidance can be coupled to the fibers and formed to be close together near the focal plane of the collimating lens. This allows great flexibility with respect to the range of beam sizes and angles of incidence which can be achieved. For example, the small spacing possible between the ends of the input and output waveguides allows for small beam sizes and a small angle of incidence. Weak guiding or no guiding in one dimension (for example, by using a slab waveguide), or a tapered 'horn-like' structure can be used to introduce anamorphic expansion of the beam. The combination of waveguide separation control and anamorphic expansion provides considerable flexibility for matching the output waveguide mode shape with the reflected beam. Additionally, the waveguide surface can be polished to provide tilt to the wavefronts.

Finally, as shown in 1(h), the non-normal incidence and small angle of incidence approaches may be combined to optimize results.

Figure 2:
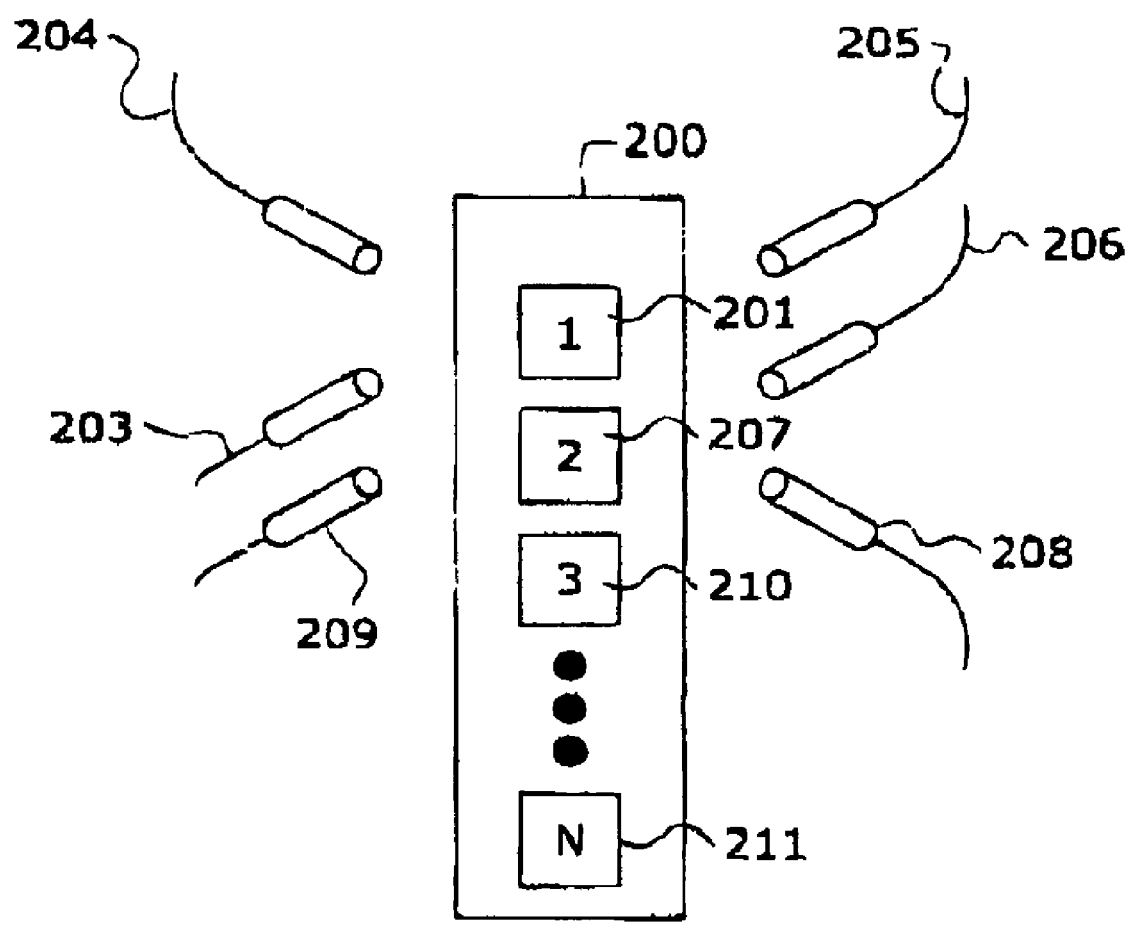
FIG. 2 is a schematic view of a 1×N optical filter array according to an exemplary embodiment of the present invention.

FIG. 2 shows a 1×N optical filter array 200 having optical filters 201 in accordance with another exemplary embodiment of the present invention. The optical filter array 200 is substantially identical to the optical filter array 101 described in conjunction with the exemplary embodiment of FIG. 1. As such, the duplicative details of the optical filter array 200 as well as optical filters 201 are forgone in the interest of brevity of discussion.

In the exemplary embodiment shown in FIG. 2, two sequential optical signals may be readily extracted. To this end, a first input collimator 203 inputs WDM/DWDM signal having a plurality of wavelength channels. The first input collimator 203 is illustratively aligned relative to a first optical filter 201, which reflects wavelength channel 1 having center wavelength $\lambda_1$. As described in connection with the exemplary embodiment of FIG. 1(a), light of the wavelength channel 1 is reflected and is incident upon the first output collimator 204, which is suitably aligned to receive the reflected light. Light of all of the remaining wavelength channels of the optical signal is transmitted through the optical filter element, and is incident upon a second output collimator 205.

The second input collimator 206 is aligned with a second optical filter element 207 which is designed to reflect light of a wavelength channel 2 having a center wavelength $\lambda_2$. In a manner similar to that described immediately above, the light is reflected by the second filter element 207 and is incident upon a third output collimator 208, which is aligned to receive the reflected light. Finally, the unreflected optical signal having all remaining wavelength channels is transmitted through the optical filter, and is incident upon a fourth output collimator 209.

In the exemplary embodiment shown in FIG. 2, if the input optical signals from first and second input collimators 203 and 206 are the same WDM or DWDM signal, by virtue of the optical filter array 200 of FIG. 2, adjacent channels (e.g., channel 1 and channel 2) may be readily extracted. Moreover, as described in conjunction with the exemplary embodiment of FIGS. 1(a) and 1(c), relative motion of the input and output collimators and the optical filter array 200 will allow the extraction of another two wavelengths. To this end, the optical filter elements (i.e. first optical filter element 201, second optical filter element 207, third optical filter element 210, . . . , Nth optical filter element 211) illustratively each reflect a different wavelength channel. Accordingly, by moving the optical filter array 200 relative to the input and output ports, it is possible to align the respective input ports and output ports to another two of the optical filters, enabling the extraction of light of two other frequencies/wavelengths. Of course, this may be used to extract wavelength channels of a WDM or DWDM system as described immediately above.

In the presently described exemplary embodiment, the optical filter elements 201, 207, 210, 211, etc., illustratively are designed to extract sequential optical wavelengths channels, although this is not necessarily the case. To wit, it may be that it is not desired to extract certain optical signals, or that the ordering of the optical filters be sequential. Because of the flexibility offered by the process for fabricating monolithic optical filter array according to the present invention, the optical filter elements may be fabricated in a plethora of combinations as the end user may require. Consequently, the fabrication of an array of optical filter elements such as described in conjunction with the illustrative embodiment of FIG. 2 may be readily achieved by virtue of the present invention, thereby offering significant benefits from the perspective of large-scale manufacturability and cost. Moreover, while this advantage of flexibility of design afforded by the glass monolithic optical filter array of the present invention has been described in connection with the illustrative embodiment of FIG. 2, it is noted that this certainly pertains to the other illustrative embodiments of the present invention described herein. Finally, it is again noted that in the exemplary embodiment in which the optical signal is a WDM or a DWDM system, there may be N-filters for n-wavelength channels having center wavelengths $\lambda_1, \ldots, \lambda_n$. For purposes of illustration, N may be 40, 80, 100, 200 or 400. Of course, this is merely illustrative and intended to be in no way limiting of the present invention.

As is well known, it is often useful in optical communication systems to filter out a particular set of optical wavelengths/frequencies. For example, it may be useful to extract a particular set of WDM or DWDM channels from an optical signal containing channels 1 , . . . , n. In the exemplary embodiments shown in FIGS. 3(a), 3(b), wavelength channels 1–4 and wavelength channels 5–8, respectively, of a WDM/DWDM signal may be extracted from a multi-channel optical signal. The optical filter array 300 illustratively is identical to the glass monolithic optical filter arrays 200 and 101, as the optical filter elements therein. As such, the details of the filter elements and materials are not repeated in the interest of brevity and clarity.

In the exemplary embodiment shown in FIG. 3(a), a first input collimator 302 is aligned to a first filter element 301 which illustratively reflects wavelength channel 1 having center wavelength $\lambda_1$ of the WDM/DWDM signal from the first input collimator 302. The reflected light is incident upon a first output collimator 303, and the channel 1 is thereby extracted. Moreover, all remaining channels are transmitted and are incident upon second output collimator 304.

Similarly, wavelength channel 2 having center wavelength $\lambda_2$ is extracted from the optical signal from input collimator 305 by reflection from a second filter element 306 that selectively reflects wavelength channel 2. This reflected channel is incident upon a third output collimator 307, while all remaining optical channels incident from the second input collimator 305 are transmitted and incident upon a fourth output collimator 308. Likewise, channel 3 having center wavelength $\lambda_3$ is extracted from the input signal from a third input collimator 309 and is reflected a third optical filter element 310 which reflects wavelength channel 3 to the fifth output collimator 311. All remaining channels are transmitted to a sixth output collimator 312. Finally, channel 4 may be extracted from an optical signal of fourth input collimator 313, which is aligned with a fourth optical filter element 314 that reflects wavelength channel 4 having center wavelength $\lambda_4$. Channel 4 is extracted by reflection and is incident upon a seventh output collimator 315, while all remaining optical channels are transmitted through the chosen optical filter elements 314 to the eighth output collimator 315.

Turning to FIG. 3(b), a second optical filter array 300 is useful in extracting optical channels 5–8 from a WDM/DWDM optical signal. In the interest of brevity, because the method of extraction of the optical channels using the optical filter array 300 of FIGS. 3(a) and 3(b) are identical, most details are forgone. Succinctly, a fifth optical filter element 316 reflects wavelength channel 5 having center wavelength λ5; a sixth optical filter element 317 reflects wavelength channel 6 having center wavelength λ6; a seventh optical filter element 318 wavelength channel 7 having center wavelength λ7; and eighth optical filter element 319 reflects wavelength channel 8 having center wavelength λ8. Of course, input and output collimators are aligned to the respective filter elements as shown to enable the extraction of the optical signal.

Figure 3:
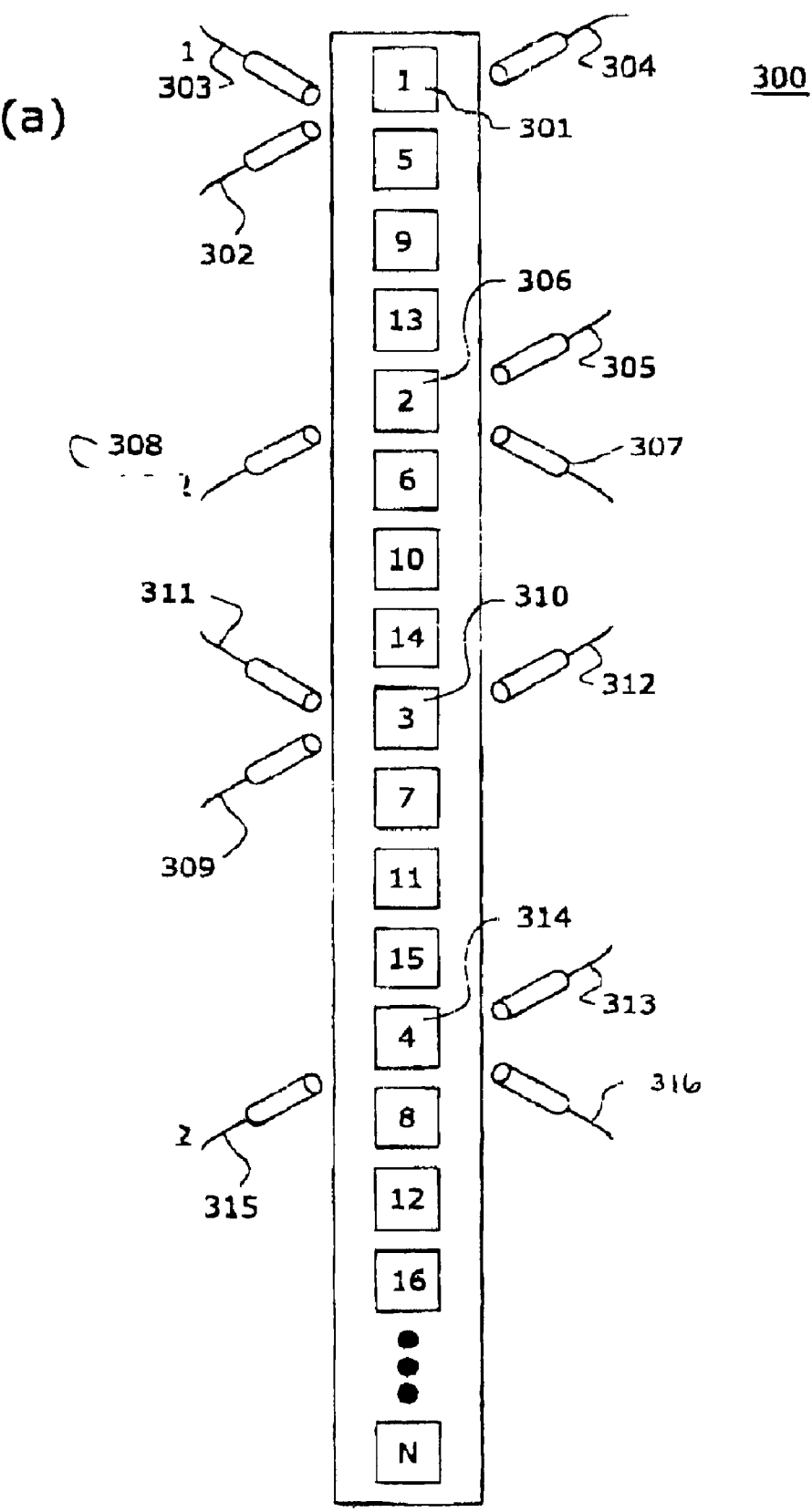
FIGS. 3(a) and 3(b) are schematic views of exemplary embodiments of the present invention in which wavelength channels are extracted from a multi-channel optical signal.
Figure 3:
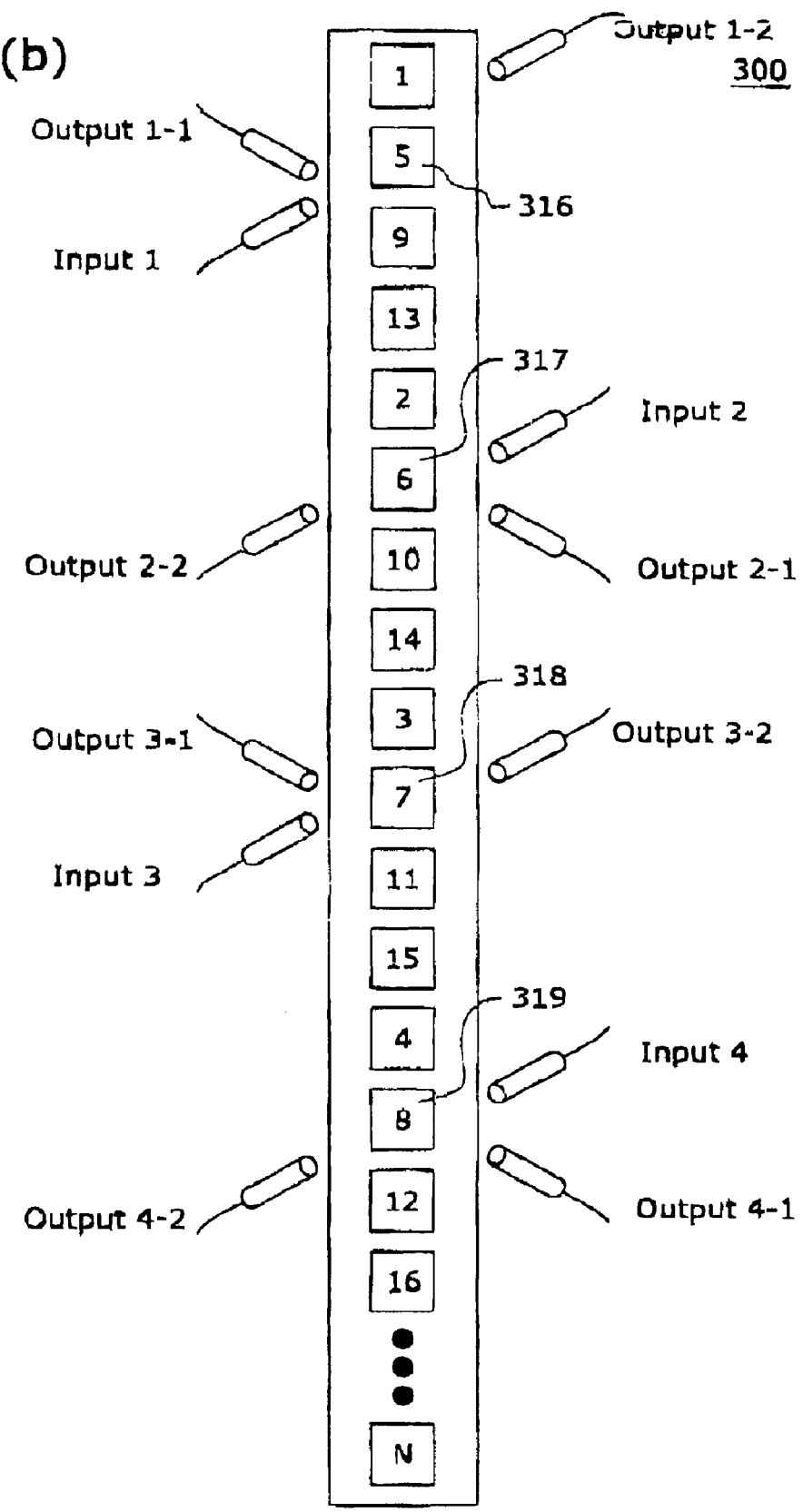

From the above exemplary embodiments described in connection with FIGS. 2–3(b), the number of wavelength channels extracted may be varied. Moreover, by simple relative motion of the optical filter array and collimators, the optical filter array can be reconfigured to extract other channels. It is noted that optical signals may be input from either side of the filter array, and, as shown in FIG. 3(a) and 3(b), the filter elements may be ordered in a non-sequential manner. Moreover, in the illustrative embodiments shown in FIGS. 3(a) and 3(b), the non-sequential ordering of the filter elements enables the extraction of four sequential multiplexed channels, advantageously enabling an increased distance between collimators sets. Finally, it is noted that the filter elements may be cascaded, and channels not extracted by a first filter may be input to a second filter. This process of course may continue. As can be readily appreciated, cascading is useful in reducing the insertion loss if the through loss is less than the splitting loss of the corresponding 1:N coupler. The ability to cascade also makes it possible to use the device as an add or drop filter in an add/drop multiplexer.

In the exemplary embodiments describe thus far, the filter elements for each WDM channel are located in a single optical filter array. It is noted that it may be beneficial from the perspective of manufacturing, for example, to limit the number of optical filter elements in a single array. Moreover, it may be useful to have multiple glass monolithic optical filter arrays combined into a single device to provide an increased tuning range. Multiple glass monolithic optical filter arrays may use more than two dimensions of translation to effect selective alignment of the collimators. Moreover, the optical filter arrays may be placed serially, enabling one-dimensional translation of motion. Still, as described presently, an input/output collimator pair may be dedicated for each array.

Figure 4:
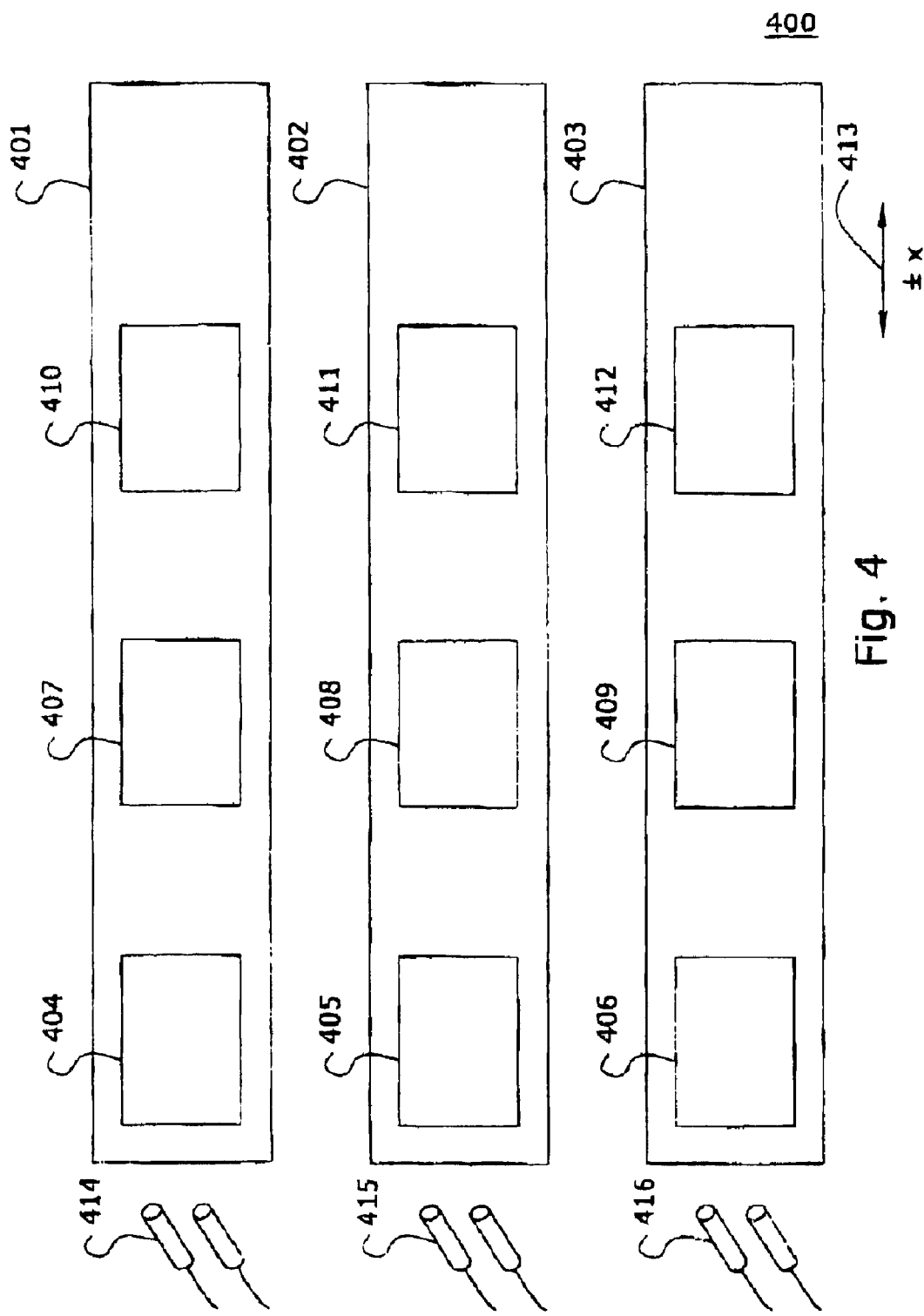
FIG. 4 is a schematic view of a stacked optical filter array.

Tuning to FIG. 4, a stacked optical filter array structure 400 is shown. In the exemplary embodiment shown in FIG. 4, the stacked optical filter array structure 400 includes a first monolithic optical filter array 401, a second monolithic optical filter array 402 and a third monolithic optical filter array 403. Each of the first, second and third glass monolithic optical filter arrays are virtually identical to those described in connection with the exemplary embodiments of FIGS. 1(a), 2, and 3(a)–3(b), and as such, repetition of these details is omitted in the interest of brevity and clarity of discussion.

A first collimator pair 414, which is substantially identical to that described in conjunction with FIG. 1(c), is selectively aligned to one of the optical filter elements of the first monolithic optical filter array 401 for the selective extraction of a particular wavelength channel. In the present illustrative embodiment the first optical filter element 404 reflects a channel 1 having a channel center wavelength $\lambda_1$. As such, alignment of the first collimator pair 414 with first optical filter element enables channel 1 to be extracted from an WDM/DWDM optical signal.

Similarly, a second collimator pair 415, may be aligned to one of the optical filter elements of the second monolithic optical filter array 402. Illustratively a second optical filter 405 reflects channel 2, having channel center wavelength $\lambda_2$. As such, if the second collimator pair 415 is aligned to a second optical element 405 of the monolithic optical filter array 402, channel 2 may be extracted.

Likewise, a third collimator pair 416 which is substantially identical to first input collimator pair 414 may be selectively aligned to one of the optical elements of the third monolithic optical filter array 403. For example, if the third collimator pair 416 is aligned to a third filter element 406, which reflects channel 3 having a center wavelength $\lambda_3$, channel 3 may be extracted.

By the translational motion in the ±x-direction 413, the second column of filter elements comprised of filter elements 407, 408 and 409 may be aligned with their respective optical collimator pairs for the extraction of channels 4, 5 and 6. Likewise, alignment of a third column of filter elements 410, 411 and 412 with their respective collimator pairs enables the extraction of the channels 7, 8 and 9 in the exemplary embodiment of FIG. 4.

In the exemplary embodiment shown in FIG. 4, translational motion (in the ±x direction 413) of the first monolithic optical filter array 401 and the enables the selective alignment of the optical filter elements therein to the first input/output collimator pair 414. Similarly, the translational motion of the second monolithic optical filter array 402 enables the selective alignment to the second input/output collimator pair 415; and the translational motion of the third monolithic optical filter array 403 enables the selective alignment of the optical filter elements therein to the third input/output collimator pair 416. The translational motion may be effected and controlled using methods and apparati described above. Moreover, it is noted that the alignment of the input/output collimators 414, 415 and 416 to respective optical filters elements can be effected in a variety of combinations, enabling a plethora of demultiplexing schemes. Finally, it is note that the collimator pair could move to effect alignment.

Figure 5:
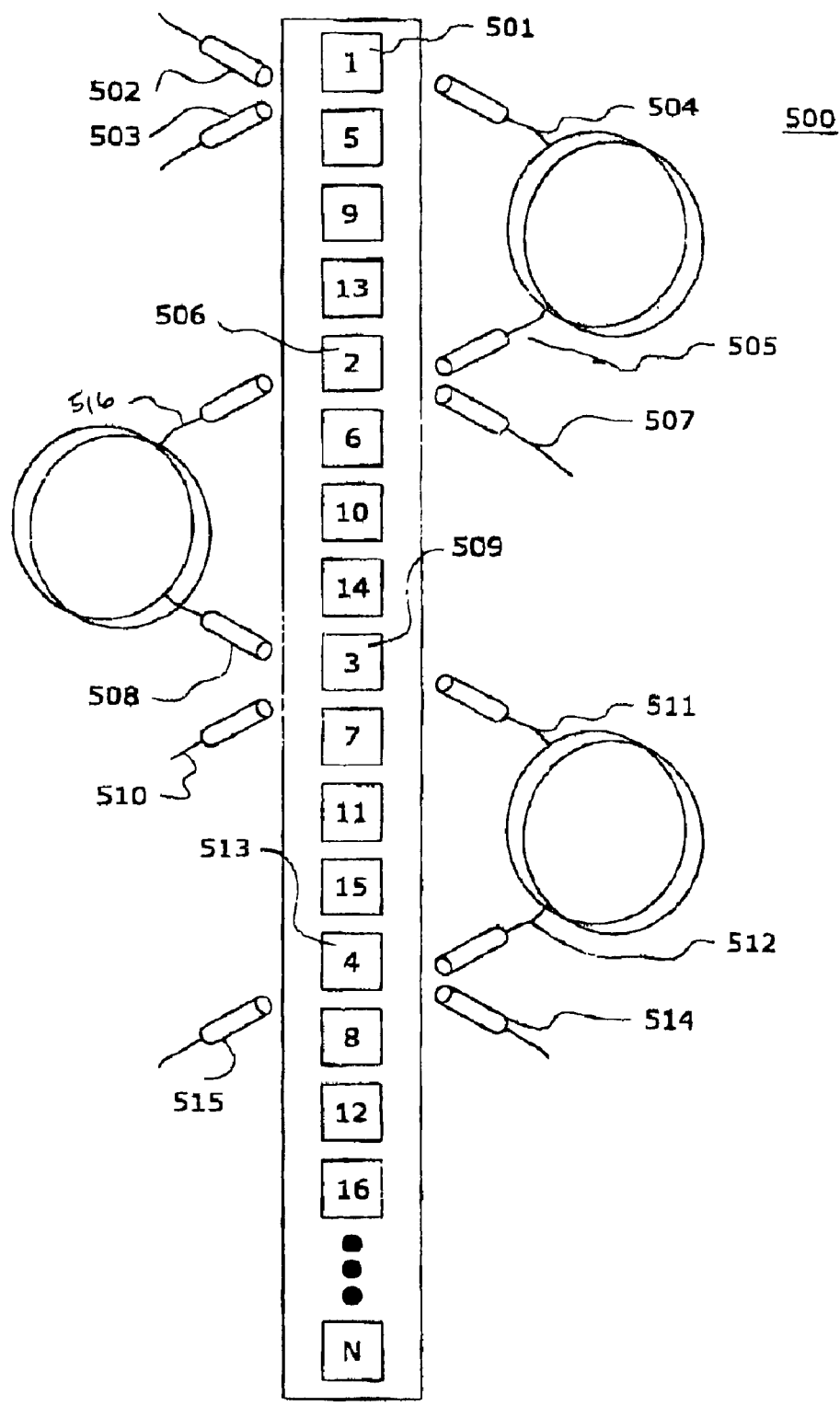
FIG. 5 is a schematic view of an exemplary embodiment of the present invention.

FIG. 5 shows another exemplary embodiment of the present invention. A glass monolithic optical filter array 500 has a plurality of optical filter elements 501. The optical filter array, optical filter elements and collimators in the exemplary embodiment of FIG. 5 are virtually identical in substance to those described in connection with FIGS. 3(a)–4. As such, details which are duplicative are omitted in the interest of brevity.

In the exemplary embodiment shown in FIG. 5, a four-channel cascaded filter structure with reflective optical filter elements 501 is positioned to drop four WDM/DWDM channels, illustratively channels 1–4, of an optical signal containing channel 1 , . . . , channel N. To this end, an input collimator 502 illustratively inputs an optical signal having a plurality of WDM/DWDM optical channels. First optical filter element 501 reflects wavelength channel 1. This reflected light is incident upon a first output collimator 503, and thus channel 1 is extracted. The remaining channels of the optical signal are transmitted through the first optical filter element 501 and are incident upon a second output collimator 504.

A second input collimator 505 transmits the remaining channels of the optical signal to a second optical filter element 506 which reflects channel 2. The reflected wavelength channel is incident upon a third output collimator 507, while the remaining optical channels are transmitted through the second filter element 506 and are incident upon a fourth output collimator 507. The remaining channels are transmitted to a third input collimator 508, which is aligned to a third filter element 509 and which reflects wavelength channel 3. This reflected light is incident upon a fifth output collimator 510, and channel 3 is thus extracted. The remaining channels are incident upon a sixth output collimator 511, and the optical signal containing these channels are transmitted to a fourth input collimator 512, which is in alignment with a fourth filter element 513, and which reflects wavelength channel 4. The reflected light is incident upon a seventh output collimator 514, and channel 4 is thus extracted. The remaining channels are transmitted through the fourth filter element 513 to an eighth output collimator 515.

As described previously, the relative motion of optical filter array 500 and the input and output collimators enables the selective dropping of optical channels through the selective alignment of the input and output collimators to the 1-N filter elements of optical filter array 500.

In accordance with an exemplary embodiment of the present invention a monolithic optical filter array may have a plurality of rows of filter elements. Illustratively, this multiple row device could be used to form a passive reconfigurable optical add/drop multiplexer. Such an add/drop multiplexer is shown in an exemplary embodiment in FIG. 6. A glass monolithic optical filter array 600 includes a first row of optical filter elements 601 and a second row of optical filter elements 602. The materials of the substrate, and the filter elements of the exemplary optical filter array 600 are virtually identical in substance and function to those described in connection with the exemplary embodiments of the present invention discussed in connection with FIGS. 1(a), and 2–5. As such, in the interest of brevity of discussion, details are omitted.

Each row 601, 602 contains filter elements 1-N. In the exemplary embodiment shown, filter element 1 (e.g., 604, 610) is designed to reflect light having a first wavelength corresponding to the center wavelength of channel 1, while transmitting light of all other wavelengths. Likewise, filter element N is designed to reflect light having a wavelength corresponding to the center wavelength of channel N. In the exemplary embodiment shown in FIG. 1, an add/drop input collimator 603 illustratively transmits an optical signal having channels 1-N. By reflection of first filter element 1 (604), channel 1 is dropped, and is incident illustratively upon a channel 1 drop collimator 605. All remaining channels are transmitted through filter element 1 (604) to output collimator 606. These remaining channels are then incident upon filter element 3 (607) via input collimator 608, and by similar technique, channel 3 is dropped. Through the principle of reciprocity of optics, the reverse of each of the described processes can be used to add a channel, in this case channel 1 and channel 3, using the same element referenced. To add channel 1, a channel 1 add collimator 609 is oriented relative to channel 1 filter element 610, such that channel 1 is reflected from channel 1 filter element 610, and is incident upon add/drop output collimator 611. Add/drop collimator 611 may include a WDM/DWDM signal received from the various combinations of collimators and filters of optical filter array 600. In this manner, channel 1 may be added to a WDM/DWDM optical signal. Likewise, from a review of the positioning and orientation of the various collimators and filter elements of the exemplary embodiment of FIG. 6, channels 3 and 5 may be selectively added/dropped to/from WDM/DWDM optical signals in accordance with the present exemplary embodiment. Moreover, as can be readily appreciated, translation motion of the collimators relative to the optical filter array enables the adding/dropping of other optical channels of a WDM/DWDM signal.

Figure 6:
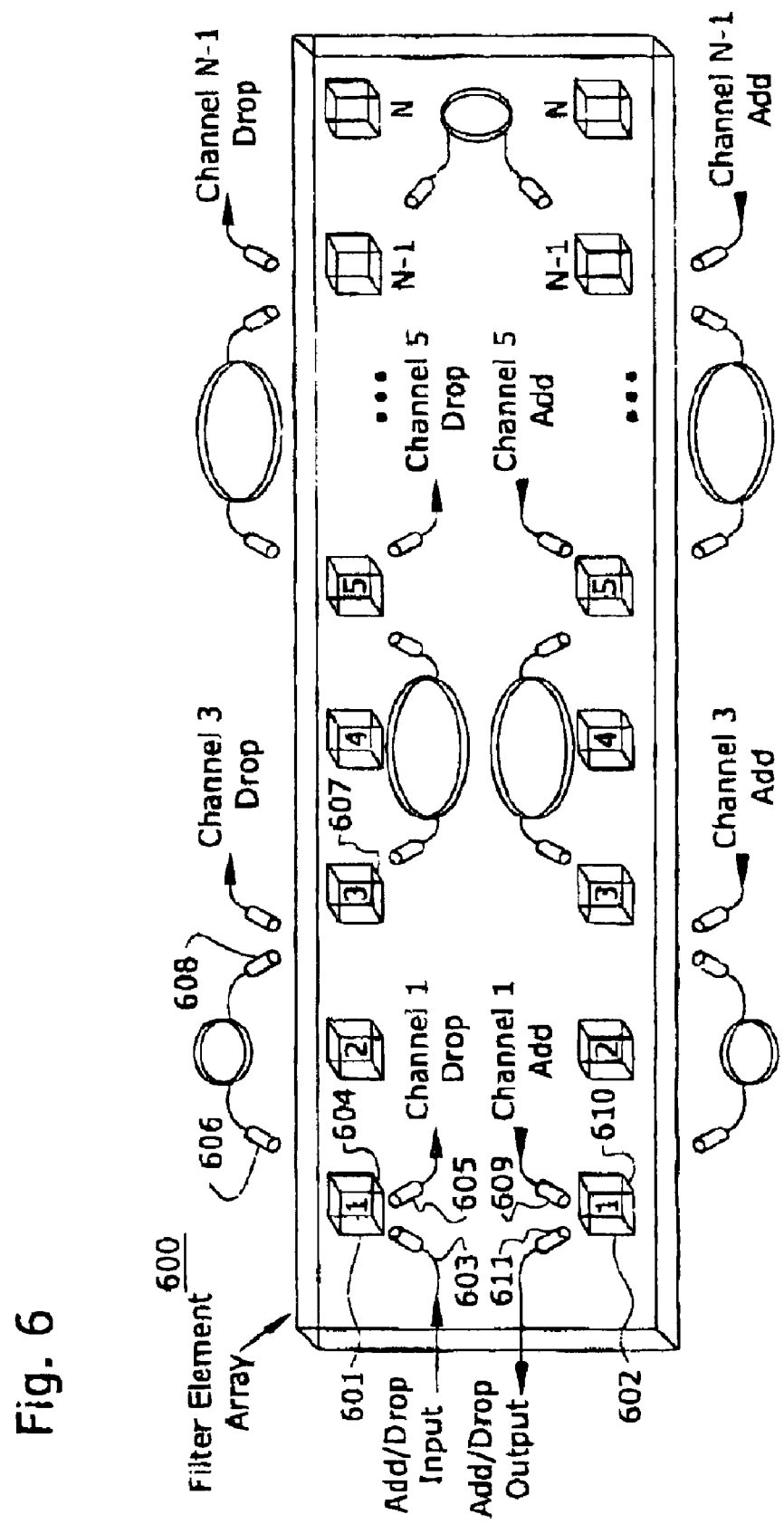
FIG. 6 is a schematic view of an add/drop multiplexer in accordance with an exemplary embodiment of the present invention.

It is noted that the above 2-row optical filter array of the exemplary embodiment of FIG. 6 is merely an illustrative application of a 2-row array. Clearly, other uses of such a multiple-row array may be exploited. Such uses are within the purview of one having ordinary skill in the art having has the benefit of the present disclosure. It is further noted that in the exemplary embodiment shown in FIG. 6, the filter elements in first row 601 and second row 602 are contiguous. Of course, as described previously, this is not essential. As such, the ordering of the various filter elements may be tailored to the individual needs of the user.

Figure 7:
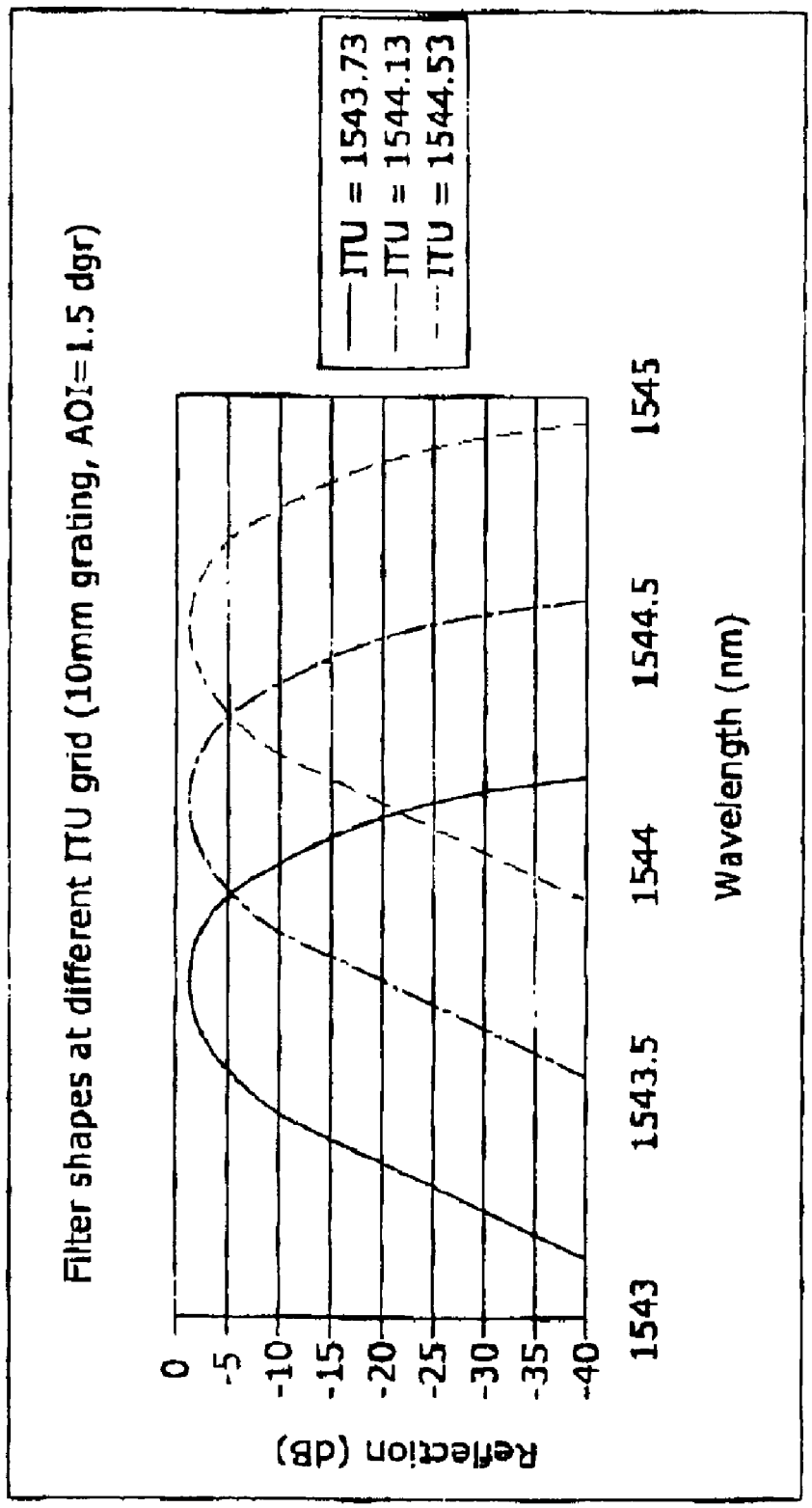
FIG. 7 is a graph of reflectivity versus wavelength for three optical filter elements of a monolithic glass optical filter array in accordance with an exemplary embodiment of the present invention.

FIG. 7 is a graph of the reflectivity versus wavelength for three optical filter elements of a monolithic glass optical filter array in accordance with an exemplary embodiment of the present invention. The first filter element reflects an ITU wavelength channel having a center wavelength of 1543.73 nm. The second and third filter elements reflect second and third reflected wavelength channels, respectively having center wavelengths of 1544.13 nm and 1544.53, respectively. As described previously, an advantageous aspect of the optical filter elements of an exemplary embodiment of the present invention an insertion loss versus frequency/wavelength that has both steep transition regions outside of the passband of the filter element and a relatively flat filter function, as is shown in FIG. 7.

The invention having been described in detail in connection through a discussion of exemplary embodiments, it is clear that modifications of the invention will be apparent to one having ordinary skill in the art having had the benefit of the present disclosure. Such modifications and variations are included in the scope of the appended claims.

We claim:

1. An optical apparatus, comprising:
  a glass monolithic structure which includes a plurality of optical filter elements, wherein said glass monolithic structure is not an optical fiber, wherein the glass monolithic structure is formed in a melted photosensitive glass substrate, wherein the photosensitive glass substrate is a includes a germanosilicate glass and has a molecular hydrogen content of less than approximately $10^{17}$ $H_2$ molecules/cm$^3$.

2. An optical apparatus as recited in claim 1, wherein said optical filter elements are chosen from the group consisting of: Bragg gratings; holographic filters; and guided mode resonance filters.

3. An optical apparatus as recited in claim 1, wherein said optical filter elements are interferometric optical elements.

4. An optical apparatus as recited in claim 1 wherein the germanosilicate glass comprises approximately 40 mole % to approximately 80 mole % $SiO_2$, approximately 2 mole % to approximately 15 mole % $GeO_2$, approximately 10 mole % to approximately 36 mole % $B_2O_3$, approximately 1 mole % to approximately 6 mole % $Al_2O_3$, and approximately 2 mole % to approximately 10 mole % $R_2O$ wherein R is an alkali.

5. An optical apparatus as recited in claim 1 wherein the germanosilicate glass comprises approximately 25 weight % to approximately 45 weight % $SiO_2$, approximately 3 weight % to approximately 22 weight % $GeO_2$, approximately 7 weight % to approximately 28 weight % $B_2O_3$, approximately 6 weight % to approximately 22 weight % $Al_2O_3$, approximately 6 weight % to approximately 25 weight % $R_2O$ wherein R is an alkali, and approximately 3 weight % to approximately 11 weight % F.

6. An optical apparatus as recited in claim 1, wherein said optical filter elements are arranged in an M×N array, where M and N are integers.

7. An optical apparatus as recited in claim 6, wherein said optical filter elements of said M×N array each reflect one of a plurality wavelength channels 1, . . . , n.

8. An optical apparatus as recited in claim 7, wherein said optical filter elements are arranged to reflect contiguous wavelength channels.

9. An optical apparatus as recited in claim 7, wherein said optical filter elements are not arranged to reflect contiguous wavelength channels.

10. An optical apparatus as recited in claim 1, wherein the apparatus further comprises:
  a plurality of said glass monolithic structures, each of which has an M×N array of said optical filter elements; and said plurality of said glass monolithic structures are arranged to form an J×N array of said optical filter elements, where J, M and N are intergers.

11. An optical apparatus as recited in claim 10, wherein said optical filter elements of each of said M×N arrays each reflect one of a plurality of wavelength channel 1 , . . . , n.

12. An optical apparatus as recited in claim 11, wherein said optical filter elements are arranged to reflect contiguous wavelength channels.

13. An optical apparatus as recited in claim 15, wherein said optical filter elements are not arranged to reflect contiguous wavelength channels.

14. An optical apparatus, comprising:
  at least one glass monolithic structure which includes a plurality of optical filters; and
  at least one device which selectively aligns an optical input and an optical output to one of said plurality of optical filters, wherein the glass monolithic structure is formed in a melted photosensitive germanosilicate glass substrate.

15. An optical apparatus as recited in claim 14, wherein said device effects dimensional motion of said glass monolithic structure.

16. An optical apparatus as recited in claim 14, wherein said device effects motion of said optical input and output.

17. An optical apparatus as recited in claim 14, wherein said input and said output are a collimator pair.

18. An optical apparatus as recited in claim 14, wherein an output collimator is selectively aligned with one of said plurality of optical filter elements to receive an optical signal which is transmitted through said optical filter element.

19. An optical apparatus as recited in claim 18, wherein said output collimator is optically coupled to an input of another optical apparatus, forming a cascaded structure.

20. An optical apparatus as recited in claim 14, wherein said optical filter elements are chosen from the group consisting of: Bragg gratings; holographic filters; and Fabry-Perot etalon filters.

21. An optical apparatus as recited in claim 14, wherein said optical filter elements are interferometric optical elements.

22. An optical apparatus as recited in claim 14 wherein the germanosilicate glass comprises approximately 40 mole % to approximately 80 mole % $SiO_2$, approximately 2 mole % to approximately 15 mole % $GeO_2$, approximately 10 mole % to approximately 36 mole % $B_2O_3$, approximately 1 mole % to approximately 6 mole % $Al_2O_3$, and approximately 2 mole % to approximately 10 mole % $R_2O$ wherein R is an alkali.

23. An optical apparatus as recited in claim 14 wherein the germanosilicate glass comprises approximately 25 weight % to approximately 45 weight % $SiO_2$, approximately 3 weight % to approximately 22 weight % $GeO_2$, approximately 7 weight % to approximately 28 weight % $B_2O_3$, approximately 6 weight % to approximately 22 weight % $Al_2O_3$, approximately 6 weight % to approximately 25 weight % $R_2O$ wherein R is an alkali, and approximately 3 weight % to approximately 11 weight % F.

24. An optical apparatus as recited in claim 14, wherein said photosensitive germanosilicate glass substrate has a molecular hydrogen content of less than $10^{17} H_2$ molecules/$cm^3$.

25. An optical apparatus as recited in claim 14, wherein said germanosilicate photosensitive glass substrate has a molecular hydrogen content of greater than approximately $10^{17} H_2$ molecules/$cm^3$ and a fluorine content of approximately 6% weight percent or less of fluorine.

26. An optical apparatus as recited in claim 14, further comprising: a plurality of said glass monolithic structures each of which include an M×N array of optical filter elements, and said plurality of glass monolithic structures are arranged to form a J×N array of said optical filter elements, where J, M and N are integers.

27. An optical apparatus as recited in claim 26, wherein each of said plurality of monolithic glass structures is disposed proximate a respective collimator, pair; and each of said collimator pairs is selectively aligned by a respective one of said devices to a selected one of said optical filter elements by translational motion.

28. A method of adding/dropping an optical signal, comprising:
providing a plurality of glass monolithic structures, each of which includes a plurality of optical filter elements in a M×N array, the plurality of glass monolithic structures being arranged in a stack to provide a stacked J×N array of filter elements; providing at least one optical input and at least one optical output; and selectively aligning the optical input and the optical output to one of said plurality of optical filters elements.

29. A method as recited in claim 28, wherein said optical filter elements are chosen from the group consisting of: Bragg gratings; holographic filters; and Fabry-Perot etalon filters.

30. A method as recited in claim 28, wherein said optical filter elements are interferometric optical elements.

31. A method as recited in claim 28, wherein said glass monolithic structure is a melted photosensitive glass substrate.

32. A method as recited in claim 31, wherein said melted photosensitive glass substrate includes a germanosilicate glass.

33. A method as recited in claim 32 wherein the germanosilicate glass comprises approximately 40 mole % to approximately 80 mole % $SiO_2$, approximately 2 mole % to approximately 15 mole % $GeO_2$, approximately 10 mole % to approximately 36 mole % $B_2O_3$, approximately 1 mole % to approximately 6 mole % $Al_2O_3$, and approximately 2 mole % to approximately 10 mole % $R_2O$ wherein R is an alkali.

34. A method as recited in claim 32 wherein the germanosilicate glass comprises approximately 25 weight % to approximately 45 weight % $SiO_2$, approximately 3 weight % to approximately 22 weight % $GeO_2$, approximately 7 weight % to approximately 28 weight % $B_2O_3$, approximately 6 weight % to approximately 22 weight % $Al_2O_3$, approximately 6 weight % to approximately 25 weight % $R_2O$ wherein R is an alkali, and approximately 3 weight % to approximately 11 weight % F.

35. A method as recited in claim 32, wherein said photosensitive glass substrate has a molecular hydrogen content of less than approximately $10^{17} H_2$ molecules/$cm^3$.

36. A method as recited in claim 31, wherein said photosensitive glass substrate has a molecular hydrogen content of greater than approximately $10^{17} H_2$ molecules/$cm^3$ and a fluorine content of approximately 6% weight percent or less of fluorine.

37. A method as recited in claim 28, wherein an output collimator is selectively aligned with one of said plurality of optical filter elements to receive an optical signal which is transmitted through said optical filter element.

38. A method as recited in claim 37, wherein said output collimator is optically coupled to an input of another optical apparatus, forming a cascaded structure.

39. An optical apparatus, comprising:
a plurality of bulk glass monolithic structures, each of which includes a plurality of optical filter elements in an M×N array, the plurality of bulk glass monolithic structures being stacked to form a J×N array of optical filter elements wherein each of the glass monolithic structures is formed in a melted photosensitive glass substrate.

40. An optical apparatus as recited in claim 39, wherein said optical filter elements are chosen from the group consisting of: Bragg gratings; holographic filters; and guided mode resonance filters.

41. An optical apparatus as recited in claim 39, wherein said optical filter elements are interferometric optical elements.

42. An optical apparatus as recited in claim 39, wherein each of the melted photosensitive glass substrates includes a germanosilicate glass.

43. An optical apparatus as recited in claim 42, wherein each of the photosensitive glass substrates has a molecular hydrogen content of less than approximately $10^{17} H_2$ molecules/$cm^3$.

44. An optical apparatus as recited in claim 39, wherein each of the photosensitive glass substrates has a molecular hydrogen content of greater than approximately $10^{17} H_2$ molecules/$cm^3$ and a fluorine content of approximately 6% weight percent or less of fluorine.

45. An optical apparatus as recited in claim 39, wherein said optical filter elements of said M×N array each reflect one of a plurality wavelength channels 1 , . . . , n.

46. An optical apparatus as recited in claim 45, wherein said optical filter elements are arranged to reflect contiguous wavelength channels.

47. An optical apparatus as recited in claim 45, wherein said optical filter elements are not arranged to reflect contiguous wavelength channels.

* * * * *